Patented Oct. 21, 1952

2,614,930

UNITED STATES PATENT OFFICE 2,614,930

METHOD OF PREPARING POLYVINYL ALCOHOL-SILVER HALIDE PHOTOGRAPHIC EMULSIONS

Wesley G. Lowe and Kearney P. Griffin, Rochester, N. Y., assignors to Eastman Kodak Company, Rochester, N. Y., a corporation of New Jersey No Drawing. Application August 13, 1947, Serial No. 768,478

13 Claims. (Cl. 95—7)

This invention relates to polyvinyl alcohol-silver halide photographic emulsions in which a gelatin derivative dispersion of the silver halide is mixed with the polyvinyl alcohol to form the emulsion.

Photographic emulsions have been previously prepared in which polyvinyl alcohols have been employed as the vehicle; however, in many cases the grain size of the silver halide is not that desired and sensitivity may be limited. Gelatin which is commonly employed for peptizing silver halide is not compatible with polyvinyl alcohols. Hydrolyzed gelatin which may be employed as a peptizer is not well adapted for emulsion washing operations in that it tends to diffuse during emulsion washing so that an inevitable source of silver-loss occurs. Synthetic resins have been considered for use in forming silver-halide dispersions to be employed in preparing polyvinyl alcohol emulsions but the sensitivity possible with many of these leaves much to be desired.

One object of our invention is to provide a method of preparing silver halide-polyvinyl alcohol photographic emulsions in which the peptized grains of silver halide may be washed before mixing with the vehicle. Another object of our invention is to prepare silver halide-polyvinyl alcohol photographic emulsions to which a high degree of sensitivity may be imparted. Other objects of our invention will appear herein.

We have found that dispersions of silver halide using a gelatin derivative as the dispersing agent when mixed with polyvinyl alcohols produce compatible emulsions to which a high degree of sensitivity may be imparted and also make possible emulsions substantially free of salts and other unwanted water-soluble impurities. We have found that such emulsions have the advantages of ready Ostwald ripening and that maximum speed can be obtained by heating as is standard practice with gelatin emulsions.

Gelatin derivatives such as are useful in emulsions in accordance with our invention are prepared by reacting an aromatic sulfonyl chloride, a carboxylic acid chloride, a carboxylic acid anhydride, an aromatic isocyanate or a 1,4-diketone with gelatin at an elevated pH such as 8–12 at a temperature of 20–60° C. Some of the compounds which may be reacted with gelatin to form gelatin derivatives suitable for use in our invention are as follows:

Sulfonyl chlorides

Benzene sulfonyl chloride
p-Methoxybenzene sulfonyl chloride
p-Phenoxybenzene sulfonyl chloride
p-Bromobenzene sulfonyl chloride
p-Toluene sulfonyl chloride
m-Nitrobenzene sulfonyl chloride
m-Sulfobenzoyl dichloride
Naphthalene-beta-sulfonyl chloride
p-Chlorobenzene sulfonyl chloride
3-nitro-4-aminobenzene sulfonyl chloride
3-carboxy-4-bromobenzene sulfonyl chloride
1-chlorosulfonyl-2-hydroxy-3-naphthoic acid
Quinoline-8-sulfonyl chloride
m-Carboxybenzene sulfonyl chloride
2-amino-5-methylbenzene-sulfonyl chloride

Carboxylic acid chlorides

Phthalyl chloride
p-Nitrobenzoyl chloride
Benzoyl chloride
Ethyl chlorocarbonate
Furoyl chloride

Acid anhydrides

Phthalic anhydride
Benzoic anhydride
Succinic anhydride
Maleic anhydride
Isatoic anhydride

Isocyanates

Phenyl isocyanate
p-Bromophenyl isocyanate
p-Chlorophenyl isocyanate
p-Tolyl isocyanate
p-Nitrophenyl isocyanate
α-Naphthyl isocyanate
β-Naphthyl isocyanate

1,4-diketones

Acetonyl acetone
Dimethyl acetonyl acetone
Diethyl diacetyl succinate

The following examples illustrate the preparation of gelatin derivatives. The gelatin derivatives, generally, listed above may be prepared in a like manner.

*Example 1.*—m-Carboxy benzene sulfonyl chloride derivative of gelatin. 100 parts of gelatin were dissolved in 625 parts of distilled water at 50° C., and this solution was then cooled to 40° C. A pH of 10 was imparted to this solution by incorporating therein with stirring sufficient 10% aqueous sodium hydroxide to bring the pH of the solution to this value. Then over a period of twenty minutes a solution of 10.5 parts of m-carboxy benzene sulfonyl chloride in solution in 50 parts of isopropyl alcohol was added while maintaining the temperature at 40° C. and adding sodium hydroxide solution from time to time so that the pH remained at 10±0.2. After the addition of the reagent the solution was stirred for ten minutes at 40° C. The pH was then adjusted to 7 by adding dilute sulfuric acid thereto, and the mass was allowed to solidify in a refrigerator. After shredding into noodles the gelatin was washed free from the reaction products with cold water and dried in a current of warm dry air.

*Example 2.*—Maleic anhydride derivative of gelatin. A solution of 100 parts of gelatin in 600 parts of distilled water at 40° C. was prepared and aqueous 10% sodium hydroxide was added thereto to bring the pH to 10. The solution was stirred vigorously and a solution of 10 parts of maleic anhydride in 50 parts of dry acetone was added over a period of ten minutes, sodium hydroxide solution being added from time to time to maintain the pH at approximately 10. The temperature was kept at 40° C. After the addition of the anhydride, the solution was stirred for ten minutes and then dilute acid was added to adjust the pH to 7. The solution was placed in a refrigerator to obtain setting and was then washed as described in the preceding example. Care must be exercised not to wash the gelatin derivative for too long a time as it absorbs water quite readily and may make the gelatin solution so dilute that it is difficult to dry.

*Example 3.*—Phthalic anhydride derivative of gelatin. In a manner similar to that described in the preceding example a gelatin derivative is prepared from 100 parts of gelatin by adding thereto a solution of 7 parts of phthalic anhydride in 50 parts of dry acetone at the prescribed pH and temperature. The phthalic anhydride derivative is then washed and dried as described in the preceding examples.

In its broadest aspects our invention comprises forming a dispersion of silver-halide grains in a solution of a gelatin derivative and subsequently adding that silver-halide dispersion to an aqueous solution of the polyvinyl alcohol to be employed as the vehicle thereby forming the photographic emulsion. Our invention, however, is particularly valuable for washed silver halide-polyvinyl alcohol emulsions.

The dispersion of silver-halide grains in a gelatin derivative may be prepared by either of two methods: (1) the gelatin derivative is used as the peptizer in the preparation of the silver halide or (2) the silver halide is prepared in an aqueous solution of gelatin, and the gelatin is then converted into the gelatin derivative.

In the first method a solution of a soluble silver salt is reacted with a solution of a soluble alkali-metal halide, such as potassium bromide (chloride or iodide), in an aqueous solution of a gelatin derivative with rapid stirring whereby silver halide grains of small size are obtained suspended in the gelatin derivative solution.

In the second method the silver halide is prepared in an agitated aqueous solution of gelatin after which the pH is adjusted to a pH of 9–12 with a suitable base, such as sodium hydroxide (or ammonium hydroxide), and a solution of the reagent for formation of the gelatin derivative is added. Usually a time of five minutes is adequate to assure completion of the reaction.

After the dispersion of silver halide in gelatin derivative has been formed, it is next desirable to remove water-soluble salts therefrom by washing. This is conveniently accomplished by acidifying the mass with an acid which has no derogatory effect on the dispersion, to a pH of 3.0 to 4.5 whereupon the gelatin derivative coagulates and envelopes the silver-halide grains forming a granular coagulum. As considerable neutral electrolyte is present (being one of the products of the reaction forming silver halide) the coagulation takes place readily upon acidifying and the adjustment of pH is not particularly critical. The granular coagulum settles, and the liquid may be removed therefrom by decanting or siphoning. For some types of emulsions this coagulum may be used without further washing, for instance, in the preparation of emulsions for the coating of paper and other permeable supports. This coagulum may, therefore, be mixed with an aqueous solution of polyvinyl alcohol of suitable type, preferably at an elevated temperature, such as 40° C. and, if desired, may be sensitized to form an emulsion primarily for photographic paper.

In the preparation of emulsion for film coating it may be desirable to further reduce the content of soluble salts. The coagulum may be rinsed by treatment with cool water, preferably with the pH adjusted to the range of the isoelectric point of the gelatin derivative. The number of rinses necessary to reduce the salt content of the coagulum to the desired point is usually within the range of 1 to 4 changes of water.

As an alternative method of washing, the coagulum may be dissolved in water at an elevated pH. For instance, sufficient water and sodium or ammonium hydroxide are added so that the pH is of the order of 6 or more. The temperature of the solution is raised to approximately 40° C. and the whole stirred for a few minutes to effect redispersion of the coagulum. The gelatin derivative may then be re-coagulated by the addition of acid to reduce the pH of the solution to the coagulation point of the derivative. As neutral electrolyte is substantially absent the range of pH in which rapid coagulation occurs is considerably more critical than in the first coagulation, being 3.8–4.5. The range of pH 3.8–4.2 is convenient to operate within in this coagulation.

After the addition of acid, the coagulum will again settle; separation from the mother liquor is effected by decanting or siphoning. Usually the one cycle of re-coagulation and redispersion is sufficient but it may be repeated, if desired, as often as considered necessary.

The coagulum which has been washed by either of the two general methods outlined above may be re-dispersed and used in forming a silver halide-polyvinyl alcohol photographic emulsion by redispersing the silver halide in water and adding a solution of polyvinyl alcohol to the redispersed grains. Redispersion of the washed silver halide coagulum is effected by adjusting the pH to 6.0 or higher and stirring at 40° C. to 50° C. until the coagulum has dispersed.

The emulsions so prepared respond readily to the standard methods of chemical sensitization, or after ripening and optical sensitization. Finishing and sensitizing can also be carried out on the redispersed silver halide before the polyvinyl alcohol is added.

Any of the usual acids may be employed for lowering the pH as referred to above. Sulfuric acid and acetic acid have both been found to be satisfactory in this connection, the only criterion being that it lowers the pH to the desired range and does not derogatorily affect either the silver halide or the dispersing agent.

The polyvinyl alcohol which is employed as the vehicle in the herein described photographic emulsions may be either high viscosity, medium viscosity, or low viscosity. The material known commercially as polyvinyl alcohol is obtained by hydrolyzing polyvinyl acetate whereby substantially all of the acetyl is removed. However, commercial polyvinyl alcohol contains variable amounts of acetyl depending on the method of manufacture and the desired water-solubility of the product. Our invention includes the use of hydrolyzed polyvinyl acetates in which the major proportion of the resulting material is polyvinyl alcohol, such as having a polyvinyl alcohol content of 80% or more. Our invention includes within its scope the use of any of these far-hydrolyzed polyvinyl acetates as vehicles in the preparation of photographic emulsions.

The following examples are illustrative of our invention:

*Example 4.*—A solution was prepared containing 14.0 g. of the phthalic anhydride derivative of gelatin, 76.7 g. of potassium bromide and 1.1 g. of potassium iodide, and distilled water was added to bring the volume up to 1160 cc. This solution was heated to 57.5° C. A solution was also prepared of 100 g. of silver nitrate in 1160 cc. of distilled water, and this solution was heated to 50° C. The solution of silver nitrate was allowed to run into the solution of bromides and gelatin derivative in two minutes with rapid stirring, and the dispersion thus formed was heated for fourteen minutes at 57.5° C. The emulsion was cooled to 40° C., and the pH of the solution was lowered to 3.0 by the addition of sulfuric acid. The silver-halide grains, and the gelatin derivative precipitated in a granular mass. The grains were allowed to settle for one hour whereupon the supernatant liquid was decanted. 2300 cc. of distilled water was added, and the mass was thoroughly stirred. It was again allowed to settle, and the supernatant liquid was again decanted. After two such washes, 500 cc. of water were added and the grains were repeptized by heating for 15–60 minutes at 50° C. with the pH of the solution adjusted to 7.5 by the addition of sodium hydroxide, aqueous ammonia, etc. thereto. When the silver halide was found to be well dispersed, the pH was adjusted to 6 and a small amount of potassium bromide was added to the emulsion. Also, a small quantity of allyl thiourea which is representative of a compound containing labile sulfur (that is, a compound capable of yielding silver sulfide on reaction with a silver salt, such as silver bromide) was added. The dispersion was heated to 55° C. and maintained at that temperature until test coatings made by adding portions of the emulsion to polyvinyl alcohol at 40° C. and coating on plates and testing sensitometrically gave optimum speed and contrast with practicable fog values. The amount of compound containing labile sulfur added usually lies within the range of 1–25 mgs. which amount depends on the photographic properties of the sulfur compound employed and the properties which are desired in the final emulsion. After the sensitometric tests had shown that the resulting material had the optimum desired properties, it was then cooled to 40° C. and was then poured into 1000 cc. of a 10% solution of high viscosity polyvinyl alcohol (prepared by hydrolysis of V–80 polyvinyl acetate) and 900 cc. of water were added. Wetting agent and 80 cc. of 4% borax solution (adjusted to a pH of about 5.5) were then added, and the emulsion was coated onto a film base. The emulsion coating was fumed with ammonia gas to set the same and was then dried in a current of warm dry air. The method of setting polyvinyl alcohol emulsions by incorporating borax therein and fuming with ammonia is described and claimed in our application, Serial No. 501,990, now Patent No. 2,376,371.

On exposure and processing it was found that this emulsion had good photographic properties.

For photographic papers the re-peptized and sulfur-sensitized emulsion grains as described above were added to 2000 cc. of a 10% solution of polyvinyl alcohol. A hardener was then added. This emulsion was coated onto paper, giving a product of enlarging paper speed. For a hardener either that described in U. S. Patent 2,367,511 or that described in Lowe application, Serial No. 497,391 may be employed. After the hardener is added to the emulsion, the pH is adjusted to 5.0 and the emulsion is coated on paper stock to give a photographic paper of medium contrast and enlarging paper speed. After aging for two to four weeks, such a coating has hardened sufficiently for hot ferrotyping.

The procedure of Example 4 was repeated with various other derivatives of gelatin as follows:

1. Benzene sulfonyl chloride derivative of gelatin
2. m-Carboxybenzene sulfonyl chloride derivative of gelatin
3. Benzoyl chloride derivative of gelatin
4. Furoyl chloride derivative of gelatin
5. Maleic anhydride derivative of gelatin
6. Phenyl isocyanate derivative of gelatin
7. p-Tolyl isocyanate derivative of gelatin These gelatin derivatives are prepared by reacting upon gelatin with an acid chloride, acid anhydride or an isocyanate at a pH of 8–12.

All of these gelatin derivatives handled and dispersed well in the making of emulsions and gave film emulsions of good photographic quality when silver halide dispersions prepared therewith were dispersed in a polyvinyl alcohol vehicle in accordance with the usual practice of preparing photographic emulsions.

It is to be understood that the preparation of emulsions in the above descriptions are all carried out under darkened conditions so as to retain the sensitivity of the silver halide.

We claim:

1. A method of preparing washed polyvinyl alcohol-silver halide photographic emulsions which comprises the steps of mixing together silver nitrate and an alkali metal halide in an aqueous solution of a phthalic anhydride derivative of gelatin, coagulating the suspension of silver halide in the gelatin derivative by acidifying to a pH within the range of 3–4.5, whereby silver halide-gelatin derivative grains are formed, separating the silver halide-gelatin derivative grains thus formed from the liquid portion of the mass and incorporating those grains in an aqueous solution of polyvinyl alcohol whereby a washed silver halide-polyvinyl alcohol photographic emulsion is formed.

2. A method of preparing washed polyvinyl alcohol-silver halide photographic emulsions which comprises the steps of preparing a dispersion of silver halide in an aqueous solution of a gelatin derivative whose presence renders the so-obtained dispersion coagulable at a pH within the range of pH 3–4.5, which derivative is selected from the group consisting of the aromatic sulfonyl chloride derivatives of gelatin, the carboxylic acid chloride derivatives of gelatin, the carboxylic acid anhydride derivatives of gelatin, the aromatic isocyanate derivatives of gelatin and the 1,4 diketone derivatives of gelatin, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

3. A method of preparing washed polyvinyl alcohol-silver halide photographic emulsions which comprises the steps of mixing together a water-soluble silver salt and a water-soluble halide salt in an aqueous solution of a gelatin derivative whose presence renders the so-obtained dispersion coagulable at a pH within the range of pH 3–4.5, which derivative is selected from the group consisting of the aromatic sulfonyl chloride derivatives of gelatin, the carboxylic acid chloride derivatives of gelatin, the carboxylic acid anhydride derivatives of gelatin, the aromatic isocyanate derivatives of gelatin and the 1,4 diketone derivatives of gelatin, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

4. A method of preparing washed polyvinyl alcohol-silver halide photographic emulsions which comprises the steps of mixing together a water-soluble silver salt and a water-soluble halide salt in an aqueous solution of gelatin, converting the gelatin to a gelatin derivaitve by treating the dispersion at an alkaline pH with a reactant selected from the group consisting of the aromatic sulfonyl chlorides, the carboxylic acid chlorides, the carboxylic acid anhydrides, the aromatic isocyanates and the 1,4 diketones whereby a gelatin derivative is formed from the gelatin therein, which derivative renders the silver halide dispersion coagulable at a pH within the range of pH 3–4.5, coagulating the dispersion of silver halide gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

5. A method of preparing washed polyvinyl alcohol-silver halide emulsions which comprises the steps of preparing a dispersion of silver halide in an aqueous solution of an aromatic sulfonyl chloride derivative of gelatin whose presence renders the so-obtained dispersion coagulable at a pH within the range of pH 3–4.5, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

6. A method of preparing washed polyvinyl alcohol-silver halide emulsions which comprises the steps of preparing a dispersion of silver halide in an aqueous solution of a carboxylic acid chloride derivative of gelatin whose presence renders the so-obtained dispersion coagulable at a pH within the range of pH 3–4.5, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

7. A method of preparing washed polyvinyl alcohol-silver halide emulsions which comprises the steps of preparing a dispersion of silver halide in an aqueous solution of a carboxylic acid anhydride derivative of gelatin whose presence renders the so-obtained dispersion coagulable at a pH within the range of pH 3–4.5, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

8. A method of preparing washed polyvinyl alcohol-silver halide emulsions which comprises the steps of preparing a dispersion of silver halide in an aqueous solution of an aromatic isocyanate derivative of gelatin whose presence renders the so-obtained dispersion coagulable at a pH within the range of pH 3–4.5, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

9. A method of preparing washed polyvinyl alcohol-silver halide emulsions which comprises the steps of preparing a dispersion of silver halide in an aqueous solution of a 1,4 diketone derivative of gelatin whose presence renders the so-obtained dispersion coagulable at a pH within the range of pH 3–4.5, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

10. A method of preparing washed polyvinyl alcohol-silver halide emulsions which comprises the steps of mixing together a water-soluble silver salt and a water-soluble halide salt in an aqueous solution of a benezene sulfonyl chloride derivative of gelatin whose presence renders the so-obtained dispersion coagulable at a pH within the range of pH 3–4.5, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

11. A method of preparing washed polyvinyl alcohol-silver halide emulsions which comprises the steps of mixing together a water-soluble silver salt and a water-soluble halide salt in an aqueous solution of a benzoyl chloride derivative of gelatin whose presence renders the so-obtained dispersion coagulable at a pH within the range of pH 3–4.5, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

12. A method of preparing washed polyvinyl alcohol-silver halide emulsions which comprises the steps of mixing together a water-soluble silver salt and a water-soluble halide salt in an aqueous solution of a phenyl isocyanate derivative of gelatin whose presence renders the so-obtained dispersion coagulable at a pH within the range of pH 3–4.5, coagulating the dispersion of silver halide in gelatin derivative by adjusting to said pH whereby silver halide-gelatin derivative grains are formed, separating the thus-formed silver halide-gelatin derivative grains from the liquid portion of the mass and subsequently incorporating those grains in an aqueous solution of polyvinyl alcohol, thereby forming a washed silver halide-polyvinyl alcohol photographic emulsion.

13. A method of preparing washed polyvinyl alcohol-silver halide photographic emulsions which comprises the steps of mixing together a water-soluble silver salt and a water-soluble halide salt in an aqueous solution of a gelatin derivative whose presence renders the so-obtained dispersion coagulable at a pH within the range of pH 3–4.5, which derivative is selected from the group consisting of the aromatic sulfonyl chloride derivatives of gelatin, the carboxylic acid chloride derivative of gelatin, the carboxylic acid anhydride derivatives of gelatin, the aromatic isocyanate derivatives of gelatin and the 1,4 diketone derivatives of gelatin, coagulating the dispersion of silver halide in gelatin derivative by adjusting to said pH whereby silver halide-gelatin derivative grains are formed, separating those grains from the liquid portion of the mass, redispersing the grains in water to which has been imparted a pH which is conducive to dispersing of the silver halide-gelatin derivative grains, recoagulating the silver halide-gelatin derivative dispersions by adjusting to the coagulating pH, separating the silver halide-gelatin derivative grains thus formed from the liquid portion of the mass and incorporating those grains in an aqueous solution of polyvinyl alcohol thereby forming a washed silver halide-polyvinyl alcohol photographic emulsion.

WESLEY G. LOWE.
KEARNEY P. GRIFFIN.

REFERENCES CITED

The following references are of record in the file of this patent:

UNITED STATES PATENTS

| Number | Name | Date |
|---|---|---|
| 1,844,716 | Lambert | Feb. 9, 1932 |
| 2,139,774 | Sheppard et al. | Dec. 13, 1938 |
| 2,282,001 | Russell et al. | May 5, 1942 |
| 2,376,371 | Lowe et al. | May 22, 1945 |
| 2,489,341 | Waller | Nov. 29, 1949 |

FOREIGN PATENTS

| Number | Country | Date |
|---|---|---|
| 479,419 | Great Britain | Feb. 4, 1938 |
| 537,256 | Great Britain | June 16, 1941 |
| 580,504 | Great Britain | Sept. 10, 1946 |